United States Patent
Kim et al.

(10) Patent No.: US 9,432,594 B2
(45) Date of Patent: Aug. 30, 2016

(54) USER RECOGNITION APPARATUS AND METHOD

(71) Applicant: ELECTRONICS AND TELECOMMUNICATIONS RESEARCH INSTITUTE, Daejeon (KR)

(72) Inventors: Hyun-Gon Kim, Suwon-si (KR); Jun-Seok Park, Daejeon (KR); Hae-Ryong Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 696 days.

(21) Appl. No.: 13/686,073

(22) Filed: Nov. 27, 2012

(65) Prior Publication Data

US 2013/0271562 A1 Oct. 17, 2013

(30) Foreign Application Priority Data

Apr. 17, 2012 (KR) ........................ 10-2012-0039713

(51) Int. Cl.

| | |
|---|---|
| *H04N 5/33* | (2006.01) |
| *G06T 5/00* | (2006.01) |
| *G06T 5/50* | (2006.01) |
| *G06K 9/00* | (2006.01) |
| *G06K 9/20* | (2006.01) |
| *G06K 9/62* | (2006.01) |
| *H04N 5/222* | (2006.01) |

(52) U.S. Cl.
CPC .......... *H04N 5/332* (2013.01); *G06K 9/00335* (2013.01); *G06K 9/2018* (2013.01); *G06K 9/6289* (2013.01); *G06T 5/002* (2013.01); *G06T 5/50* (2013.01); *G06T 2207/10024* (2013.01); *G06T 2207/10048* (2013.01); *H04N 5/2226* (2013.01)

(58) Field of Classification Search
None
See application file for complete search history.

(56) References Cited

U.S. PATENT DOCUMENTS

| 5,265,172 | A | * | 11/1993 | Markandey et al. ......... 382/107 |
| 2003/0007074 | A1 | * | 1/2003 | Nagaoka ............ G06K 9/00805 348/148 |
| 2004/0005086 | A1 | * | 1/2004 | Wolff et al. .................. 382/118 |
| 2009/0294666 | A1 | * | 12/2009 | Hargel ......................... 250/330 |

FOREIGN PATENT DOCUMENTS

KR 10-2011-0013916 2/2011

* cited by examiner

*Primary Examiner* — Michael Teitelbaum
(74) *Attorney, Agent, or Firm* — Staas & Halsey LLP

(57) ABSTRACT

A user recognition apparatus includes: a visible-light image processing unit configured to acquire a visible-light image using a visible-light camera; an infrared-light image processing unit configured to acquire an infrared-light image using an infrared-light camera; a threshold value processing unit configured to remove a background of the infrared-light image using a threshold value, and generate a clipped infrared-light image; an optical flow processing unit configured to calculate an optical flow based on the clipped infrared-light image and the visible-light image, and generate a clipped visible-light image based on the calculated optical flow; and a visible light processing unit configured to recognize a user based on the clipped visible-light image.

10 Claims, 5 Drawing Sheets

USER RECOGNITION APPARATUS AND METHOD

CROSS-REFERENCE(S) TO RELATED APPLICATIONS

This application claims priority to Korean Patent Application No. 10-2012-0039713, filed on Apr. 17, 2012, which is incorporated herein by reference in its entirety.

BACKGROUND OF THE INVENTION

1. Field of the Invention

Exemplary embodiments of the present invention relate to a user recognition apparatus and method; and, particularly, to an apparatus and method for recognizing a user using an infrared-light camera and a visible-light camera.

2. Description of Related Art

A stereo camera is used for a method of acquiring depth information by processing two images acquired from two cameras. The method of acquiring depth information using two images may include a method of extracting depth information using a pixel distance between the two images. Recently, a method of extracting depth information by applying an optical flow method to two images has emerged.

The method of extracting depth information using an optical flow method cannot acquire more precise depth information than the method of extracting depth information using a pixel distance, but requires a simple initial setting and does not require a correction operation for distortion caused by a camera lens. Therefore, the depth information acquired by the method of extracting depth information using an optical flow method is mainly used in a motion recognition area which does not require precise depth information.

In the method of acquiring depth information using an optical flow method, when the size of an image is doubled side to side, the total number of pixels increases by the square of the image size, and an operation amount of the optical flow method corresponding to the image increases by the square. Although depth information is not required for motion recognition, information for motion recognition enables more precise motion recognition when including information on a larger number of pixels. Therefore, two images acquired through the stereo camera enable precise motion recognition, as the size of the two images increases.

However, with the increase of the image size, the operation amount of the optical flow method also significantly increases. Therefore, although the precision increases, the operation speed significantly decreases. In order to solve such a problem, the background of an infrared-light image acquired by an infrared-light camera may be removed to increase the speed. When the infrared-light image, of which the background is removed, is applied, it is possible to acquire depth information more quickly than when an optical flow method corresponding to the entire infrared-light image is applied.

However, when the infrared-light camera is used to collect a specific light range of data, it is possible to acquire data which are not sensitive to light dispersion or light intensity change. However, the number of color channels acquired from an image decreases, and it is difficult to apply an algorithm capable of processing an image using color values of the image.

SUMMARY OF THE INVENTION

An embodiment of the present invention is directed to a user recognition apparatus and method which acquires an infrared-light image and a visible-light image using an infrared-light camera and a visible-light camera, generates depth information using the infrared-light image and the visible-light image while minimizing an operation amount, and recognizing a user based on the depth information.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a user recognition apparatus includes: a visible-light image processing unit configured to acquire a visible-light image using a visible-light camera; an infrared-light image processing unit configured to acquire an infrared-light image using an infrared-light camera; a threshold value processing unit configured to remove a background of the infrared-light image using a threshold value, and generate a clipped infrared-light image; an optical flow processing unit configured to calculate an optical flow based on the clipped infrared-light image and the visible-light image, and generate a clipped visible-light image based on the calculated optical flow; and a visible light processing unit configured to recognize a user based on the clipped visible-light image.

The visible light processing unit may apply the clipped visible-light image to a visible-light algorithm to recognize the user, and determine a motion state of the user based on the recognition result.

The optical flow processing unit may extract feature points of the user based on the clipped infrared-light image, and map the extracted user feature points to the visible-light image to calculate an optical flow.

The optical flow processing unit may generate depth information based on a vector length of the optical flow.

The user recognition apparatus may further include a synchronization unit configured to synchronize the infrared-light camera and the visible-light camera such that the infrared-light camera and the visible-light camera acquire images corresponding to a target at the same time.

The user recognition apparatus may further include a noise cancellation unit configured to cancel noises of the clipped infrared-light image and the visible-light image.

In accordance with another embodiment of the present invention, a user recognition method includes: acquiring an infrared-light image using an infrared-light camera; acquiring a visible-light image using a visible-light camera; removing a background of the infrared-light image using a threshold value, and generating a clipped infrared-light image; calculating an optical flow based on the clipped infrared-light image and the visible-light image; generating a clipped visible-light image based on the calculated optical flow; and recognizing a user based on the clipped visible-light image.

The recognizing of the user based on the clipped visible-light image may include: applying the clipped visible-light image to a visible-light algorithm to recognize the user; and determining the motion state of the user based on the recognition result.

The calculating of the optical flow based on the clipped infrared-light image and the visible-light image may include extracting feature points of the user based on the clipped infrared-light image and mapping the extracted user feature points to the visible-light image to calculate the optical flow.

The calculating of the optical flow based on the clipped infrared-light image and the visible-light image may include generating depth information based on a vector length of the optical flow.

The infrared-light camera and the visible-light camera may be synchronized to acquire images corresponding to a target at the same time.

The user recognition method may further include removing noises of the clipped infrared-light image and the visible-light image.

DESCRIPTION OF SPECIFIC EMBODIMENTS

Figure 1:
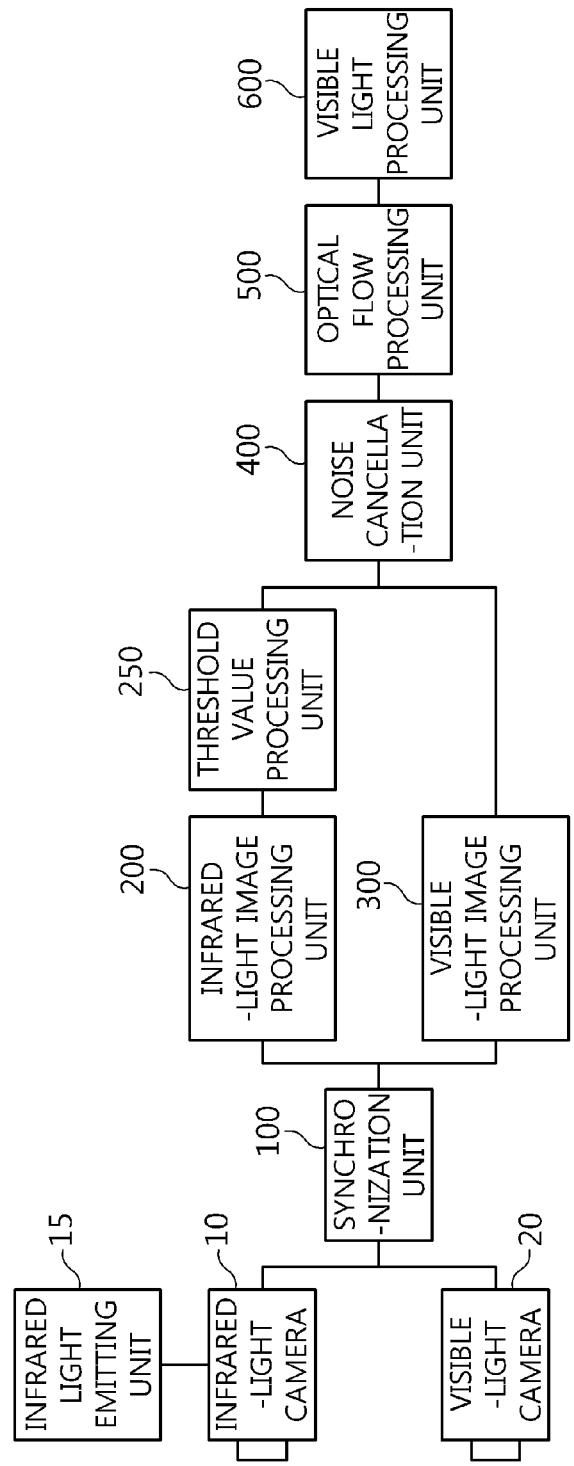
FIG. 1 is a schematic configuration diagram of a user recognition apparatus in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a schematic configuration diagram of a user recognition apparatus in accordance with an embodiment of the present invention.

Referring to FIG. 1, the user recognition apparatus includes an infrared-light camera 10, an infrared light emitting unit 15, a visible-light camera 20, a synchronization unit 100, an infrared-light image processing unit 200, a threshold value processing unit 250, a visible-light image processing unit 300, a noise cancellation unit 400, an optical flow processing unit 500, and a visible light processing unit 600.

In FIG. 1, the infrared-light camera 10 and the visible-light camera 20 are separately provided, but may correspond to one stereo camera.

The infrared light emitting unit 15 is configured to emit infrared light such that a target to be taken by the infrared-light camera 10, for example a person, reflects the infrared light and the infrared-light camera 10 acquires an image of the person.

The synchronization unit 100 is configured to synchronize the infrared-light camera 10 and the visible-light camera 20 such that the infrared-light camera 10 and the visible-light camera 20 acquire images corresponding to the target at the same time. Since the acquisition speed of the infrared-light camera 10 and the visible-light camera 20 differs depending on exposure values and brightness thereof, the synchronization unit 100 synchronizes the infrared-light camera 10 and the visible-light camera 20 to acquire the images corresponding to the infrared-light camera 10 and the visible-light camera 20 at the same time.

The synchronization unit 100 transfers the infrared-light image taken by the infrared-light camera 10 and the visible-light image taken by the visible-light camera 20 to the infrared-light image processing unit 200 and the visible-light image processing unit 300, respectively.

Figure 2:
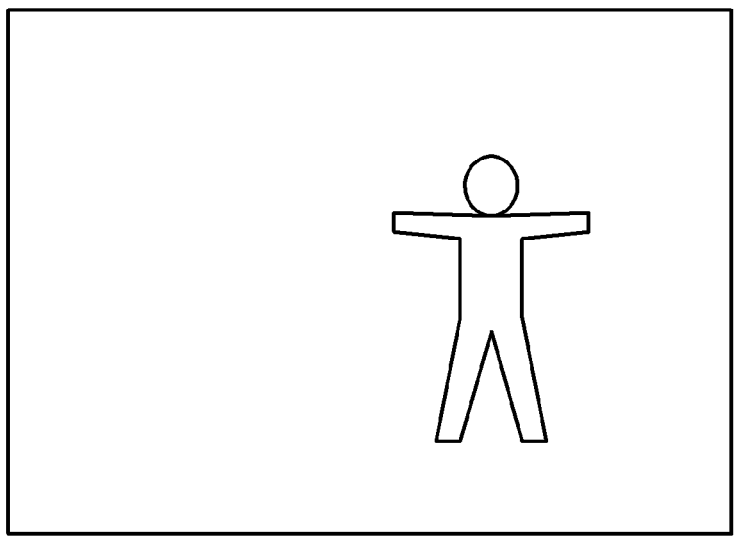
FIGS. 2 and 3 are diagrams illustrating an image acquired by a stereo camera in accordance with the embodiment of the present invention.

The infrared-light image processing unit 200 is configured to receive the infrared-light image (for example, an infrared image as illustrated in FIG. 2) taken by the infrared-light camera 10, store the infrared-light image, and transfer the infrared-light image to the threshold value processing unit 250. Referring to FIG. 2, it can be seen that the background of the infrared-light image disappears. The infrared light emitted by the infrared light emitting unit 15 reflects from the body of the person so as to be exposed to the infrared-light camera 10. In general, as a target is close to the infrared light emitting unit 15, the target has a brighter value. That is, users in the background do not appear in the infrared-light image.

Figure 3:
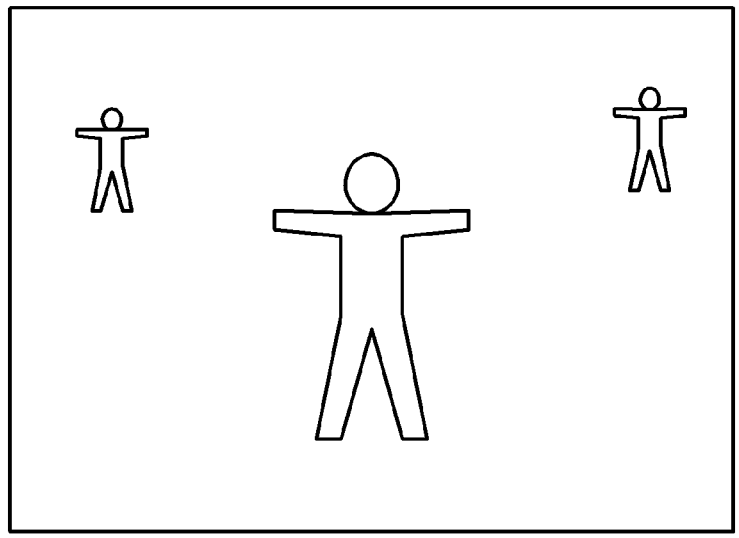

The visible-light image processing unit 300 is configured to receive the visible-light image (for example, visible-light image as illustrated in FIG. 3) taken by the visible-light camera 20, store the visible-light image, and transfer the visible-light image to the noise cancellation unit 400.

The threshold value processing unit 250 is configured to remove the background of the infrared-light image using a predetermined threshold value. Here, the predetermined threshold value may include a threshold value preset by the threshold value processing unit 250, but is not limited thereto.

Figure 4:
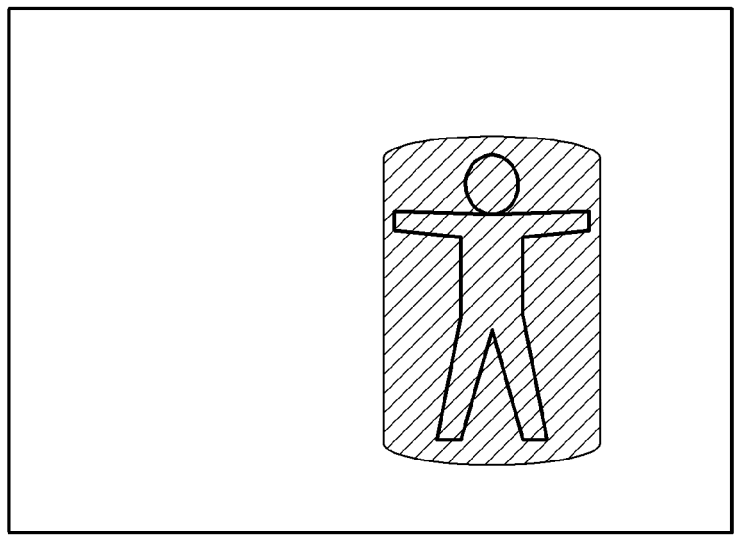
FIG. 4 is a diagram illustrating a clipped infrared-light image in accordance with the embodiment of the present invention.

FIG. 4 illustrates an infrared-light image obtained by removing the background of the infrared-light image using the predetermined threshold value, that is, a clipped image, in accordance with the embodiment of the present invention.

As illustrated in FIG. 4, only a person in a comb-pattern area of the infrared-light image is clipped, and the other area excluding the clipped area is not used for user recognition. Here, the comb-pattern area corresponds to the infrared-light image whose background is removed.

The noise cancellation unit 400 is configured to cancel noises of the visible-light image and the clipped infrared-light image.

The optical flow processing unit 500 is configured to extract feature points of the user based on the clipped infrared-light image, and calculate an optical flow by mapping the extracted feature points of the user to the visible-light image. Here, the feature points of the user correspond to location coordinates at which the user's motion is recognized, such as location coordinates of the user's face (for example, eyes, nose, mouth, and ears), location coordinates of the user's hands, and location coordinates of the user's feet.

The optical flow processing unit 500 generates depth information based on a vector length of the calculated optical flow. Here, when the vector length is larger than a reference length, it indicates a pixel in the front side, and when the vector length is smaller than the reference length, it indicates a pixel in the rear side.

Figure 5:
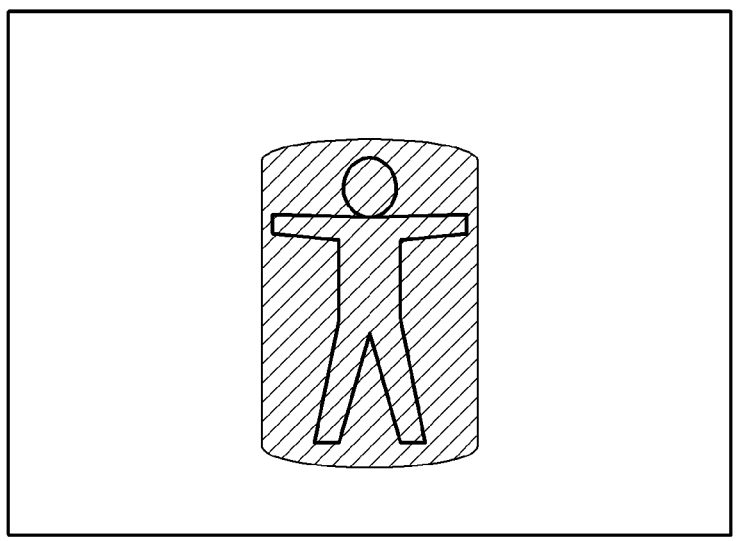
FIG. 5 is a diagram illustrating a clipped visible-light image in accordance with the embodiment of the present invention.

The optical flow processing unit 500 generates a clipped visible-light image (for example, clipped visible-light image as illustrated in FIG. 5) based on the calculated optical flow. Here, the clipped visible-light image is used for recognizing the face, hands, and fingers of the user, and corresponds to a visible-light image showing the user included in the clipped infrared-light image.

The visible light processing unit 600 is configured to apply the clipped visible light image to a specific visible light algorithm, recognize the face, hands, and fingers of the user, and determine the motion state of the user through the recognition result.

When the entire visible-light image acquired through the visible-light camera 20 is used for user recognition, other users excluding the user to be recognized not only may be recognized, but the background corresponding to the user may also be recognized. That is, the operation amount for the clipped visible-light image generated on the basis of the clipped infrared image is smaller than the operation amount for the entire visible-light image, and the noise generated by the background area may be significantly reduced.

Then, a user recognition method will be described in detail with reference to FIG. 6.

Figure 6:
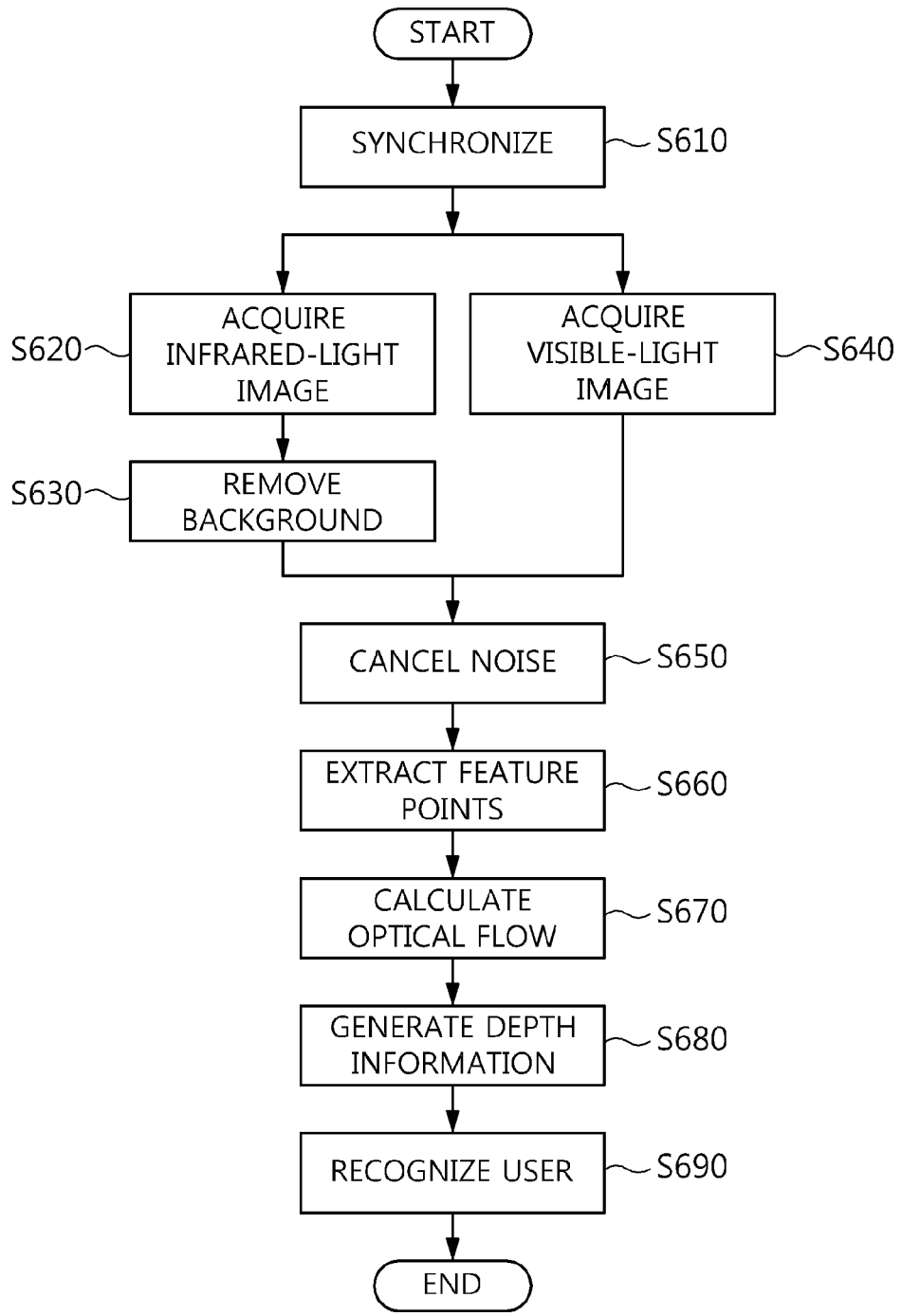
FIG. 6 is a flow chart showing a user recognition method in accordance with the embodiment of the present invention.

FIG. 6 is a flow chart showing the user recognition method in accordance with the embodiment of the present invention.

Referring to FIG. 6, the user recognition apparatus synchronizes the infrared-light camera 10 and the visible-light camera 20 at step S610 such that the infrared-light camera 10 and the visible-light camera 20 acquire images including a target, that is, a user at the same time. Since the acquisition speed of the infrared-light camera 10 and the visible-light camera 20 differs depending on exposure values and brightness thereof, the user recognition apparatus synchronizes the infrared-light camera 10 and the visible-light camera 20.

The user recognition apparatus acquires an infrared-light image taken by the infrared-light camera 10, for example, the infrared-light image as illustrated in FIG. 2, at step S620. Then, the user recognition apparatus removes the background of the infrared-light image using a predetermined threshold value at step S630. At step S630, the user recognition apparatus generates a clipped infrared-light image by removing the background of the infrared-light image using the predetermined threshold value.

The user recognition apparatus acquires the visible-light image taken by the visible-light camera 20, for example, the visible-light image as illustrated in FIG. 3, at step S640.

The user recognition apparatus removes noises of the clipped infrared-light image and the visible-light image at step S650.

The user recognition apparatus extracts feature points of the user based on the clipped infrared-light image at step S660. Here, the feature points of the user correspond to location coordinates at which the user's motion may be recognized, such as location coordinates of the user's face (for example, eyes, nose, mouth, and ears), location coordinates of the user's hands, and location coordinates of the user's feet.

The user recognition apparatus maps the extracted feature points to the visible-light image to calculate an optical flow at step S670. The user recognition apparatus generates depth information based on a vector length of the calculated optical flow, at step S680.

The user recognition apparatus generates the clipped visible-light image based on the calculated optical flow, and recognizes the user based on the generated clipped visible-light image at step S690.

The user recognition apparatus applies the generated clipped visible-light image to a specific visible-light algorithm to recognize the face, hands, and fingers of the user, and determines the motion state of the user through the recognition result.

As such, by applying the algorithm capable of processing an image in a visible-light area where it is difficult to process an image using only an infrared-light image to which the threshold value is applied, it is possible to not only increase the precision of the user recognition but also reduce noise.

While the present invention has been described with respect to the specific embodiments, it will be apparent to those skilled in the art that various changes and modifications may be made without departing from the spirit and scope of the invention as defined in the following claims.

What is claimed is:

1. A user recognition apparatus comprising:
a visible-light image processing unit configured to acquire a visible-light image using a visible-light camera;
an infrared-light image processing unit configured to acquire an infrared-light image using an infrared-light camera;
a threshold value processing unit configured to remove a background of the infrared-light image using a brightness threshold, and generate a clipped infrared-light image;
an optical flow processing unit configured to calculate an optical flow based on the clipped infrared-light image and the visible-light image, and generate a clipped visible-light image based on the calculated optical flow, wherein the optical flow processing unit extracts feature points of the user based on the clipped infrared-light image, and maps the extracted user feature points to the visible-light image to calculate an optical flow; and
a visible light processing unit configured to recognize a user based on the clipped visible-light image.

2. The user recognition apparatus of claim 1, wherein the visible light processing unit applies the clipped visible-light image to a visible-light algorithm to recognize the user, and determines a motion state of the user based on the recognition result.

3. The user recognition apparatus of claim 2, wherein the optical flow processing unit generates depth information based on a vector length of the optical flow.

4. The user recognition apparatus of claim 1, further comprising a synchronization unit configured to synchronize the infrared-light camera and the visible-light camera such that the infrared-light camera and the visible-light camera acquire images corresponding to a target at the same time.

5. The user recognition apparatus of claim 1, further comprising a noise cancellation unit configured to cancel noises of the clipped infrared-light image and the visible-light image.

6. A user recognition method comprising:
acquiring an infrared-light image using an infrared-light camera;
acquiring a visible-light image using a visible-light camera;
removing a background of the infrared-light image using a brightness threshold, and generating a clipped infrared-light image;
calculating an optical flow based on the clipped infrared-light image and the visible-light image, wherein calculating the optical flow based on the clipped infrared-light image and the visible-light image comprises extracting feature points of the user based on the clipped infrared-light image and mapping the extracted user feature points to the visible-light image to calculate the optical flow;
generating a clipped visible-light image based on the calculated optical flow;
recognizing a user based on the clipped visible-light image.

7. The user recognition method of claim 6, wherein the recognizing the user based on the clipped visible-light image comprises:
   applying the clipped visible-light image to a visible-light algorithm to recognize the user; and
   determining the motion state of the user based on the recognition result.

8. The user recognition method of claim 6, wherein the calculating the optical flow based on the clipped infrared-light image and the visible-light image comprises generating depth information based on a vector length of the optical flow.

9. The user recognition method of claim 6, wherein the infrared-light camera and the visible-light camera are synchronized to acquire images corresponding to a target at the same time.

10. The user recognition method of claim 6, further comprising cancelling noises of the clipped infrared-light image and the visible-light image.

* * * * *